(12) United States Patent
Ramankutty (10) Patent No.: US 8,522,017 B2
(45) Date of Patent: Aug. 27, 2013

(54) SYSTEMS AND METHODS FOR SIGNAL REDUCTION IN WIRELESS COMMUNICATION

(75) Inventor: Rajesh Ramankutty, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 1036 days.

(21) Appl. No.: 11/590,775

(22) Filed: Nov. 1, 2006

(65) Prior Publication Data

US 2008/0104210 A1  May 1, 2008

(51) Int. Cl.
*H04L 9/32* (2006.01)
*G06F 9/00* (2006.01)
*G06F 15/16* (2006.01)
*G06F 17/00* (2006.01)

(52) U.S. Cl.
USPC .......................................................... 713/168

(58) Field of Classification Search
USPC .................. 713/150–153, 168; 709/220–222
See application file for complete search history.

(56) References Cited

U.S. PATENT DOCUMENTS

| | | | |
|---|---|---|---|
| 7,321,583 B2 * | 1/2008 | Hahn et al. | 370/349 |
| 7,330,453 B1 * | 2/2008 | Borella et al. | 370/338 |
| 2002/0150092 A1 * | 10/2002 | Bontempi et al. | 370/389 |
| 2004/0028055 A1 | 2/2004 | Madour et al. | |
| 2004/0187021 A1 * | 9/2004 | Rasanen | 713/200 |
| 2004/0246933 A1 | 12/2004 | Valko et al. | |
| 2005/0135374 A1 | 6/2005 | Isomaki et al. | |
| 2005/0165917 A1 | 7/2005 | Le et al. | |
| 2005/0166260 A1 * | 7/2005 | Betts et al. | 726/4 |
| 2005/0204044 A1 | 9/2005 | Araki | |
| 2005/0232241 A1 * | 10/2005 | Wu et al. | 370/352 |
| 2006/0018288 A1 | 1/2006 | Luo et al. | |
| 2006/0239193 A1 | 10/2006 | Hahn et al. | |
| 2006/0276170 A1 | 12/2006 | Radhakrishnan et al. | |
| 2007/0036079 A1 | 2/2007 | Chowdury et al. | |
| 2007/0104125 A1 | 5/2007 | Ghai | |
| 2007/0204050 A1 * | 8/2007 | Liu et al. | 709/230 |
| 2007/0209061 A1 * | 9/2007 | Dekeyzer et al. | 726/3 |
| 2007/0223450 A1 * | 9/2007 | Holmstrom et al. | 370/352 |
| 2007/0291678 A1 | 12/2007 | Chowdhury et al. | |
| 2008/0062985 A1 | 3/2008 | Agarwal et al. | |

OTHER PUBLICATIONS

Fabini, J. et al., "'IMS in a Bottle': Initial Experiences from an OpenSER-based Prototype implementation of the 3GPP IP Multimedia Subsystem," International Conference on Mobile Business, ICMB '06 [online], Jun. 2006, p. 13-23 [retrieved on May 30, 2008] Retrieved from the Internet: <URL: http://userver.ftw.at/~reichl/publications/icmb06.pdf>.

(Continued)

*Primary Examiner* — Edan Orgad
*Assistant Examiner* — Jahangir Kabir
(74) *Attorney, Agent, or Firm* — Wilmer Cutler Pickering Hale and Dorr LLP (57) ABSTRACT

Embodiments of the present invention provide systems and methods for managing wireless communication sessions with reduced signaling. A system of the present invention includes an Access Gateway (AGW) system configured to interface with at least one radio access network and at least one packet data network, wherein the AGW system has a policy enforcement component. The system further includes a session control component configured to receive one or more communication session control requests, obtain session information and policy decisions corresponding to the one or more communication session control requests, and directly reconfigure the policy enforcement component to enforce the obtained session information and policy decisions.

12 Claims, 7 Drawing Sheets

(56) References Cited

OTHER PUBLICATIONS

Citiation for Fabini, J. et al., "'IMS in a Bottle': Initial Experiences from an OpenSER-based Prototype Implementation of the 3GPP IP Multimedia Subsystem," International Conference on Mobile Business. ICMB '06 [online], Jun. 2006, p. 13-23 [retrieved on May 30, 2008], Retrieved from the Internet <URL: http://ieeexplore.ieee.org/xpl/absprintf.jsp?arnumber=4124108&p.=FREE>.

International Search Report and Written Opinion issued for corresponding International Patent Application No. PCT/US2007/083288.

3GPP TS 29.207 V5 2.0 (Dec. 2002): Technical Specification. 3rd Generation Partnership Project: Technical Specification Group Core Network; Policy Control Over Go InterFace (Release 5). 2002. 53 pages.

Supplementary European Search Report issued for EP 07 86 8642, mailed Nov. 24, 2011 (7 pages).

\* cited by examiner

SYSTEMS AND METHODS FOR SIGNAL REDUCTION IN WIRELESS COMMUNICATION

FIELD OF THE INVENTION

The present invention relates to wireless communication. More particularly, the present invention relates to systems and methods for creating and managing communication sessions across radio access networks (RANs) and packet data networks (PDNs).

BACKGROUND OF THE INVENTION

Modern wireless communication networks have existed in some form for decades. Every so often, new technology and regulatory or commercial developments provide an impetus for progress in the wireless communication field. The earliest commercial ("first generation" or "1G") cellular systems used analog voice channels and digital controls, and had very limited data communication capabilities. These were replaced by "second generation" or "2G" systems that used digital radio channels for both voice and control. In addition, "third generation (3G)" communication systems, including CDMA-2000 systems and Universal Mobile Telecommunications System (UMTS) systems, have become available.

Code Division Multiple Access (CDMA) is one common form of digital communication. CDMA-2000, which is a registered trademark of the Telecommunications Industry Association, is standardized by the 3G Partnership Project-2 (3GPP2). UMTS is a competing 3G technology standardized by the 3G Partnership Project (3GPP). UMTS is a successor to Global System for Mobile Communications (GSM) and utilizes the Wideband-CDMA (W-CDMA) air interface standard and GSM infrastructures. Technologies such as CDMA-2000 and UMTS combine multiple radio channel communication with advanced data packet transmission protocols to provide high-speed data services as well as voice services over existing networks.

In a communication network based on CDMA-2000, UMTS, or other standards, a communication session (or flow) can be created, updated, and/or deleted by signaling various equipments or devices within the communication network. The signaling may include, for example, the exchange of Session Initiation Protocol (SIP) messages, and/or policy information exchanges or updates. An Access Gateway (AGW) system, which interfaces with one or more RANs and one or more PDNs, typically participates in the signaling process. Although a signaling process is necessary for establishing communication sessions, it also takes time and consumes resources. Because of the significant increase of wireless telephone use and the use of other wireless applications, it is desirable to reduce the signaling when a communication session is created, updated, and/or deleted. Embodiments of the present invention are directed to this and other important objectives.

SUMMARY OF THE INVENTION

Embodiments of the present invention provide systems and methods that reduce signaling in a wireless communication network that is associated with the setup, update, and/or teardown of communication sessions. Embodiments of the present invention can be used in conjunction with CDMA-2000, UMTS, Worldwide Interoperability for Microwave Access (WiMAX), and/or other wireless communication technologies.

According to various embodiments, a system of the present invention includes an Access Gateway (AGW) system configured to interface with at least one radio access network and at least one packet data network. The AGW system has a policy enforcement component. The system further includes a session control component configured to receive one or more communication session control requests, obtain session information and policy decisions corresponding to the one or more communication session control requests, and directly reconfigure the policy enforcement component to enforce the obtained session information and policy decisions. The session control component can include a Call Session Control Function (CSCF) component. In some embodiments, the session control component can reconfigure the policy enforcement component by sending the session information and policy decisions to the policy enforcement component using one or more Mobile IP (MIP) messages. The communication session control requests can include Session Initiation Protocol (SIP) messages.

In some embodiments, the AGW system can include a Packet Data Service Node (PDSN). In one embodiment, the session control component can be integrated with a Home Agent (HA) to form a single device. Furthermore, the session control component can reconfigure the policy enforcement component by sending the session information and policy decisions to the policy enforcement component using one or more MIP messages. In another embodiment, the session control component can be integrated with the PDSN to form a single device.

In some embodiments, the AGW system can include a Gateway GPRS Support Node (GGSN). The session control component can be integrated with the GGSN to form a single device. In some embodiments, the AGW system can include an Access Service network (ASN) Gateway configured to interface with at least one WiMAX radio access network and at least one packet data network.

According to various embodiments, a method of the present invention can include configuring an AGW system to interface with at least one radio access network and at least one packet data network, receiving at a session control component a communication session control request, and obtaining session information and policy decisions corresponding to the communication session control request using the session control component. The method also include directly reconfiguring a policy enforcement component of the AGW system with the obtained session information and policy decisions using the session control component, and enforcing the obtained policy decisions corresponding to the communication session control request at the AGW system using the policy enforcement component. The reconfiguring can include sending the session information and policy decisions from the session control component to the policy enforcement component using one or more MIP messages. The communication session control request can include a SIP message.

In one embodiment, the method further includes integrating the session control component with an HA to form a single device. Furthermore, the reconfiguring can include sending the session information and policy decisions from the session control component to the policy enforcement component using one or more MIP messages. In another embodiment, the method further includes integrating the session control component with the policy enforcement component to form a single device.

According to various embodiments, a system of the present invention includes an AGW system configured to interface with at least one radio access network and at least one packet data network, the AGW system having elements for enforcing policy decisions for one or more communication sessions. The system further includes session control elements for handling one or more communication session control requests, wherein the session control means receive the one or more communication session control requests, obtain session information and policy decisions corresponding to the one or more communication session control requests, and directly reconfigure the enforcing elements to enforce the obtained session information and policy decisions. The session control elements can reconfigure the enforcing elements by sending the obtained session information and policy decisions to the enforcing elements using one or more MIP messages. The communication session control requests can include SIP messages.

In some embodiments, the AGW system can include a PDSN. In one embodiment, the session control elements can be integrated with an HA to form a single device. Furthermore, the session control elements can reconfigure the enforcing elements by sending the session information and policy decisions to the enforcing elements using one or more MIP messages. In another embodiment, the session control elements are integrated with the PDSN to form a single device.

In some embodiments, the AGW system can include a GGSN. The session control elements can be integrated with the GGSN to form a single device. In another embodiment, the AGW system can include an Access Service network (ASN) Gateway configured to interface with at least one WiMAX radio access network and at least one packet data network.

BRIEF DESCRIPTION OF THE DRAWINGS

The Detailed Description of the Invention, including the description of various embodiments of the invention, will be best understood when read in reference to the accompanying figures wherein.

DETAILED DESCRIPTION OF THE INVENTION

Embodiments of the present invention provide systems and methods for wireless communication, wherein signaling that is associated with the setup, update, and/or teardown of communication sessions in the wireless communication network is significantly reduced. Embodiments of the present invention can be utilized in a wireless communication network that is based on CDMA-2000, UMTS, GSM, WiMAX, and/or other standards.

Figure 1:
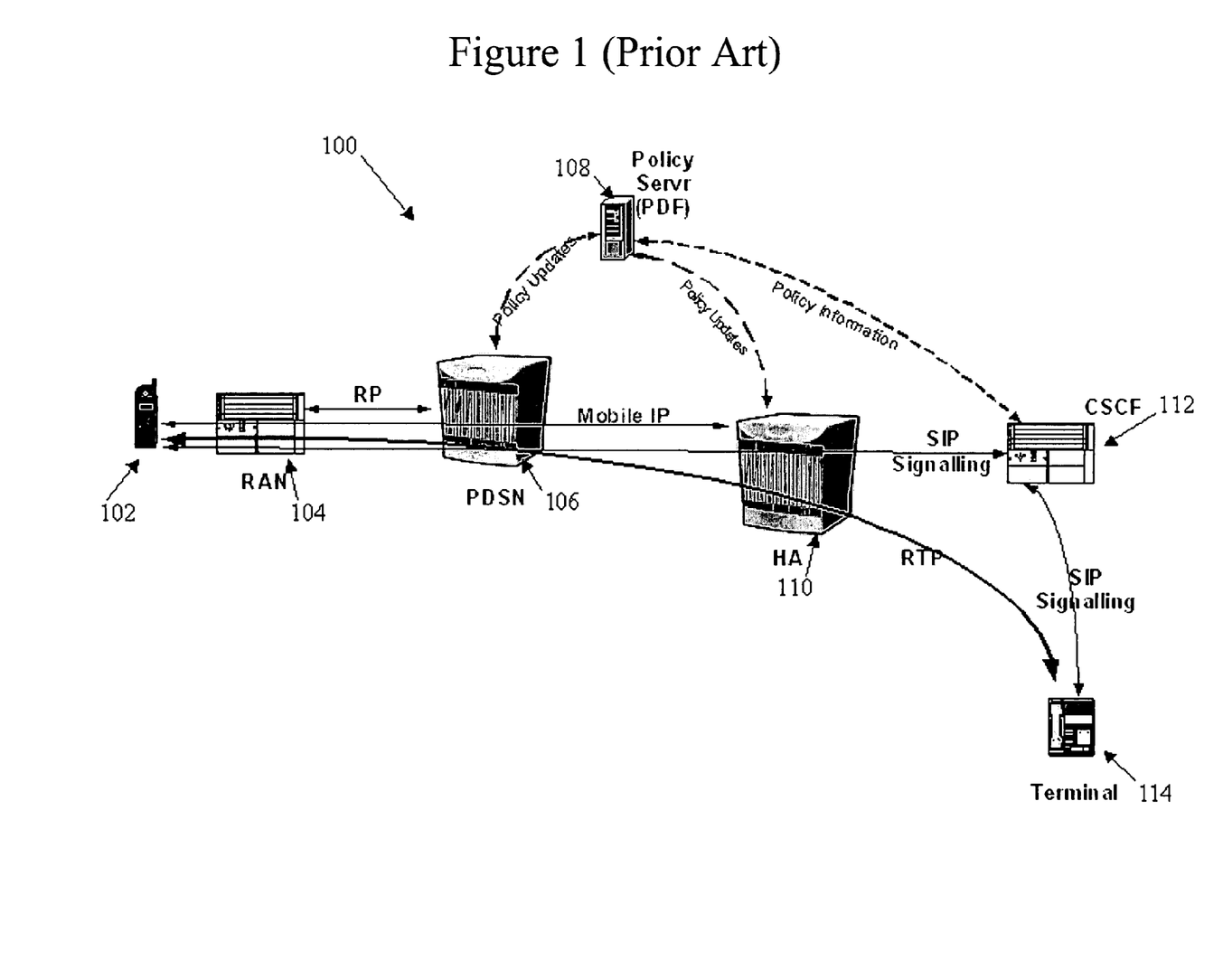
FIG. 1 is a diagram depicting a conventional communication system.

FIG. 1 is a diagram depicting a conventional wireless communication system generally at 100, which can be a system used in a CDMA-2000 network. System 100 includes a terminal 102, which can be a Mobile Station (MS) such as a cell phone that communicates with a RAN node 104 wirelessly. Node 104 can include a base station, a Base Tranceiver Station (BTS), a Base Station Controller (BSC), and a Packet Control Function (PCF) (not shown). Node 104 communicates with Packet Data Serving Node (PDSN) 106 through the radio-packet (RP) interface. PDSN 106 is in communication with a Home Agent (HA) 110, which is in turn in communication with a session control component such as a Call Session Control Function (CSCF) component 112 and a terminal 114. CSCF component 112 can include a Proxy-CSCF (P-CSCF) component that is used to proxy requests from terminals.

A external policy server 108, which can be referred to as a Policy Decision Function (PDF), is in communication with PDSN 106, HA 110, and CSCF component 112. PDSN 106, terminal 114, and HA 110 can be connected through a PDN such as an Internet Protocol (IP) network. PDSN 106 is therefore an AGW system (or a portion of an AGW system) that serves as an interface between a RAN and a PDN. PDSN 106 and HA 110 can be, for example, the ST16 Intelligent Mobile Gateway PDSN/FA and HA respectively, provided by Starent Networks Corporation of Tewksbury, Mass.

FIG. 1 also illustrates signaling that is associated with the creation of a communication session. A communication session can be, for example, a voice call or a multi-media session. To establish an end-to-end session (or flow) between terminals 102 and 114, terminal 102 can send communication session control requests such as Session Initiation Protocol (SIP) messages to CSCF component 112. CSCF component 112 in turn can send SIP messages to terminal 114. CSCF component 112 can obtain information regarding the end-to-end session and send this information to PDF 108. Upon receiving the end-to-end session information sent by CSCF component 112, PDF 108 can obtain policy decisions for the session and send policy update messages containing the policy decisions to PDSN 106 and HA 110. PDSN 106 acts as a Policy Enforcement Point (PEP) that enforces the received policy for the communication session.

End-to-end session information and policy decisions define characteristics of a communication session. End-to-end session information and policy decisions can include, but is not limited to, endpoint IP addresses, endpoint port numbers, protocol-type (UDP, TCP, RTP, etc.), Quality of Service (QoS) parameters such as bandwidth/data-rate, session time and/or volume quota, Dynamic Host Configuration Protocol (DHCP) markings, etc., charging/billing rules or parameters, traffic-policing parameters, and access control settings (i.e., GATE open/close, which determines whether to allow or disallow a flow/session).

Figure 2:
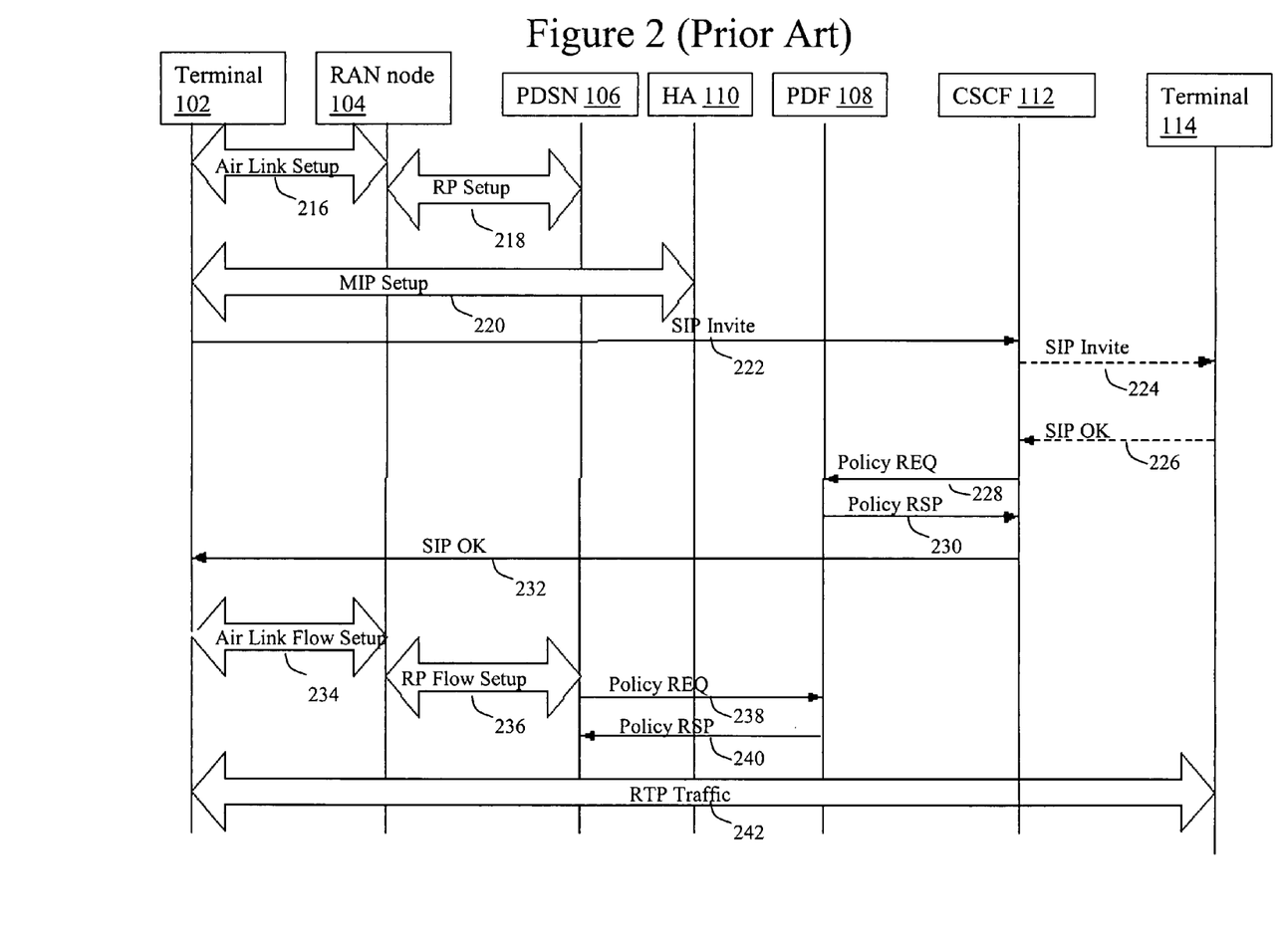
FIG. 2 is a diagram illustrating a conventional process for creating a communication session using the communication system illustrated in FIG. 1.

FIG. 2 illustrates in detail a prior art process for creating a communication session using the prior art communication system described in connection with FIG. 1. Before a communication session between terminals 102 and 114 is established, terminal 102 performs an air link setup 216 with RAN node 104, which performs an RP interface setup 218 with PDSN 106. Terminal 102 also performs a Mobile IP (MIP) setup 220 with HA 110. Terminal 102 can then send a SIP Invite message 222 to CSCF component 112, which in turn sends an SIP Invite message 224 to terminal 114. After CSCF component 112 receives a SIP OK response message 226 from Terminal 114, CSCF component 112 can send a policy request message 228 to PDF 108 to inform PDF 108 about the requested communication session, and PDF 108 can send a policy response message 230 back to CSCF component 112. CSCF component 112 can then send a SIP OK message 232 to terminal 102. Thereafter, an air link flow setup 234 is performed between terminal 102 and node 104, and an RP flow setup 236 is performed between node 104 and PDSN 106. PDSN 106 can send a policy request 238 to PDF 108 and receive a policy response message 240 from PDF 108. Once the communication session (or flow) is established, terminals 102 and 114 can communicate and send traffic 242 to each other using, for example, the Real-time Transport Protocol (RTP). From policy response 240, PDSN 106 can obtain the policy decisions associated with the communication session and can enforce the policy decisions for the session.

In conventional system 100 illustrated above, PDSN 106 receives communication session policy updates indirectly through PDF 108, instead of directly from CSCF 112. This results in an overhead in terms of the number of signaling messages communicated between the various components of the system during session creation, update, and/or teardown. As illustrated below, embodiments of the present invention provide systems with reduced signaling by allowing a session control component to directly reconfigure a policy enforcement component of an AGW system.

Figure 3:
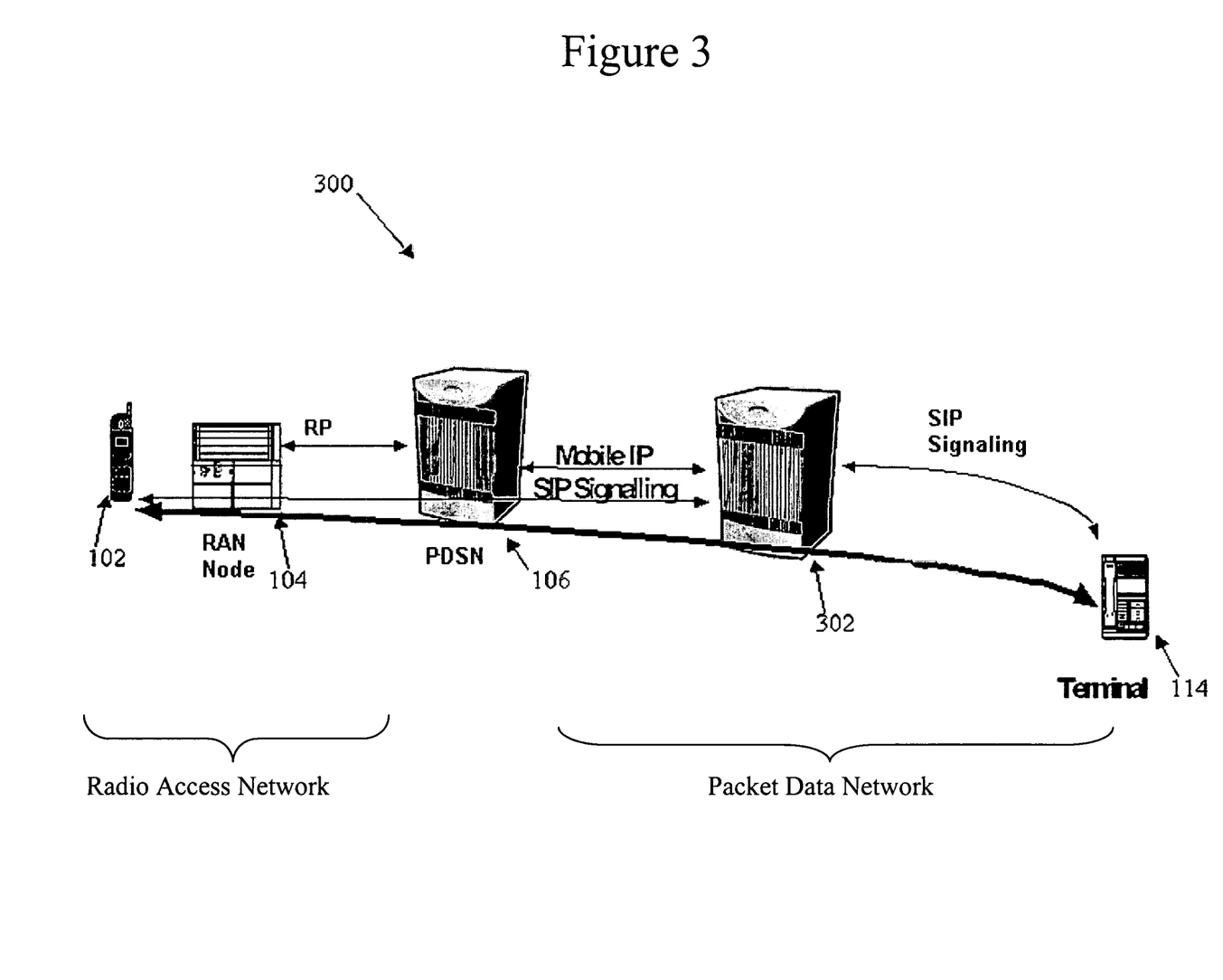
FIG. 3 is a diagram depicting a system according to various embodiments of the present invention.

FIG. 3 illustrates a system of various embodiments of the present invention generally at 300. System 300 can be a system that generally conforms to the CDMA-2000 standard. System 300 can include a terminal 102, which can be a mobile station such as a cell phone that communicates with a RAN node 104 wirelessly. Node 104 can include a Base Tranceiver Station (BTS), a Base Station Controller (BSC), and a Packet Control Function (PCF) (not shown). Node 104 communicates with a Packet Data Serving Node (PDSN) 106 through the RP interface. Different from system 100, the HA and the session control component (e.g., a CSCF component, which can include a P-CSCF component) in system 300 are, in this embodiment, integrated into a single device 302. Therefore, for communication session creation, device 302 can receive MIP messages for MIP setup, and can also receive and process signaling messages. As shown, device 302 can perform signaling with terminals 102 and 114 using, for example, the SIP protocol. Once the end-to-end communication session is established, terminals 102 and 114 can send RTP traffic to each other.

PDSN 106 in system 300 can be connected with device 302 and terminal 114 through a PDN such as an Internet Protocol (IP) network (not shown). Therefore, similar to system 100, PDSN 106 in system 300 serves as an AGW system (or a portion of an AGW system) interfacing a RAN and a PDN. PDSN 106 can be a ST16 Intelligent Mobile Gateway PDSN/FA, provided by Starent Networks Corporation of Tewksbury, Mass. As described below, device 302 can obtain end-to-end session information and policy decisions for communication sessions and can directly reconfigure PDSN 106 with the obtained session information and policy decisions. PDSN 106 can serve as a policy enforcement component (e.g., a PEP) that enforces the obtained policies for the communication sessions. Therefore, for communication session setup, update, and/or teardown, policy decisions can be directly applied to PDSN 106 in system 300, instead of indirectly using a policy server (e.g., PDF 108 in system 100). This results in a reduction of signaling that is associated with communication session setup, update, and/or teardown within the communication network.

In one embodiment, device 302 can reconfigure PDSN 106 with session information and policy decisions by sending the session information and policy decisions to PDSN 106 using the MIP protocol. In this case, the session information and policy decisions can be contained in MIP extensions of MIP messages.

Figure 4:
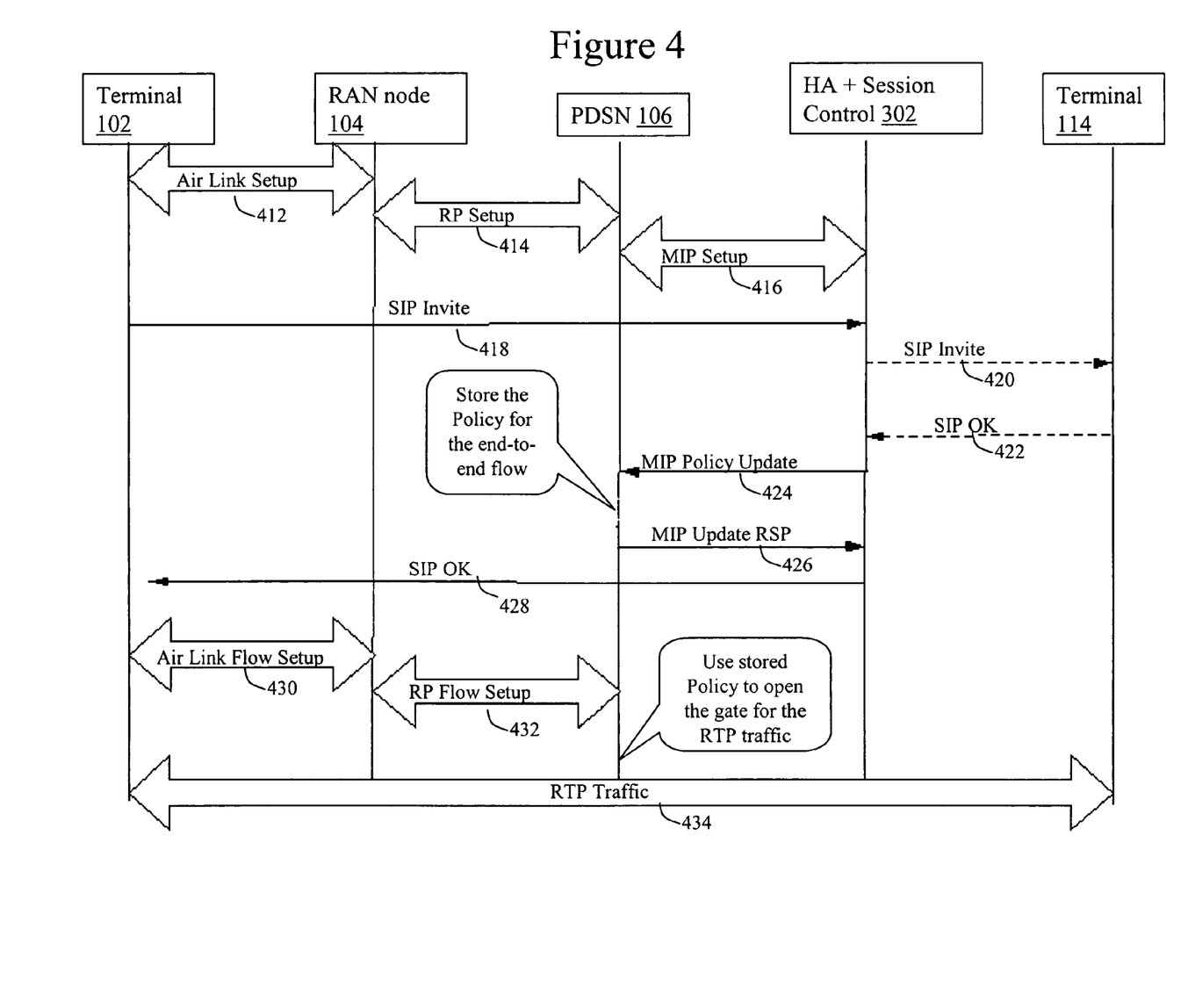
FIG. 4 is a diagram illustrating a process for creating a communication session using the communication system illustrated in FIG. 3.

FIG. 4 is a diagram illustrating a process for creating a communication session using system 300 of various embodiments of the present invention. To setup a communication session, terminal 102 can perform an air link setup 412 with RAN node 104, and node 104 can perform an RP setup 414 with PDSN 106. PDSN 106 can then perform a MIP setup 416 with integrated device 302 including both an HA and a session control component (e.g., a CSCF component). Thereafter, terminal 102 can send a communication session control request such as a SIP Invite message 418 to device 302, which can then send SIP Invite message 420 to terminal 114. Device 302 can then wait to receive a SIP OK response message 422 from terminal 114. Device 302 can also obtain end-to-end session information and policy decisions for the requested communication session and send the information and policies to PDSN 106 using, for example, MIP message 424. PDSN 106 can store the received policies for the end-to-end session and can send MIP response messages 426 back to device 302. Device 302 can then send SIP OK response message 428 to terminal 102. Thereafter, terminal 102 can perform an air link flow setup 430 with node 104, and node 104 can perform a RP flow setup 432 with PDSN 106. PDSN 106 can then use the stored policy to open the gate for subsequent RTP traffic between terminals 102 and 114, and act as a policy enforcement component (e.g., a PEP) to enforce the policy decisions for the created communication session.

Although FIG. 4 illustrates signaling reduction that is associated with the setup of communication sessions, it should be noted that various embodiments of the present invention reduce signaling that is associated with the update or teardown of communication sessions as well. This is because the session control component (e.g., a CSCF component) can communicate with the policy enforcement component of an AGW system directly regarding the changes of communication sessions. For a communication session update or teardown, a communication session control request for updating or deleting a session can be sent to device 302.

In addition, although in system 300, device 302 is an integrated device including both a HA and a session control component (e.g., a CSCF component), the present invention is not limited in this manner. A system of various embodiments of the present invention can have a policy enforcement component, a HA and a session control component as separate and distinct devices. In both cases, the session control component can obtain session information and policy decisions and directly reconfigure a policy enforcement component of an AGW system accordingly without first contacting a PDF.

Figure 5:
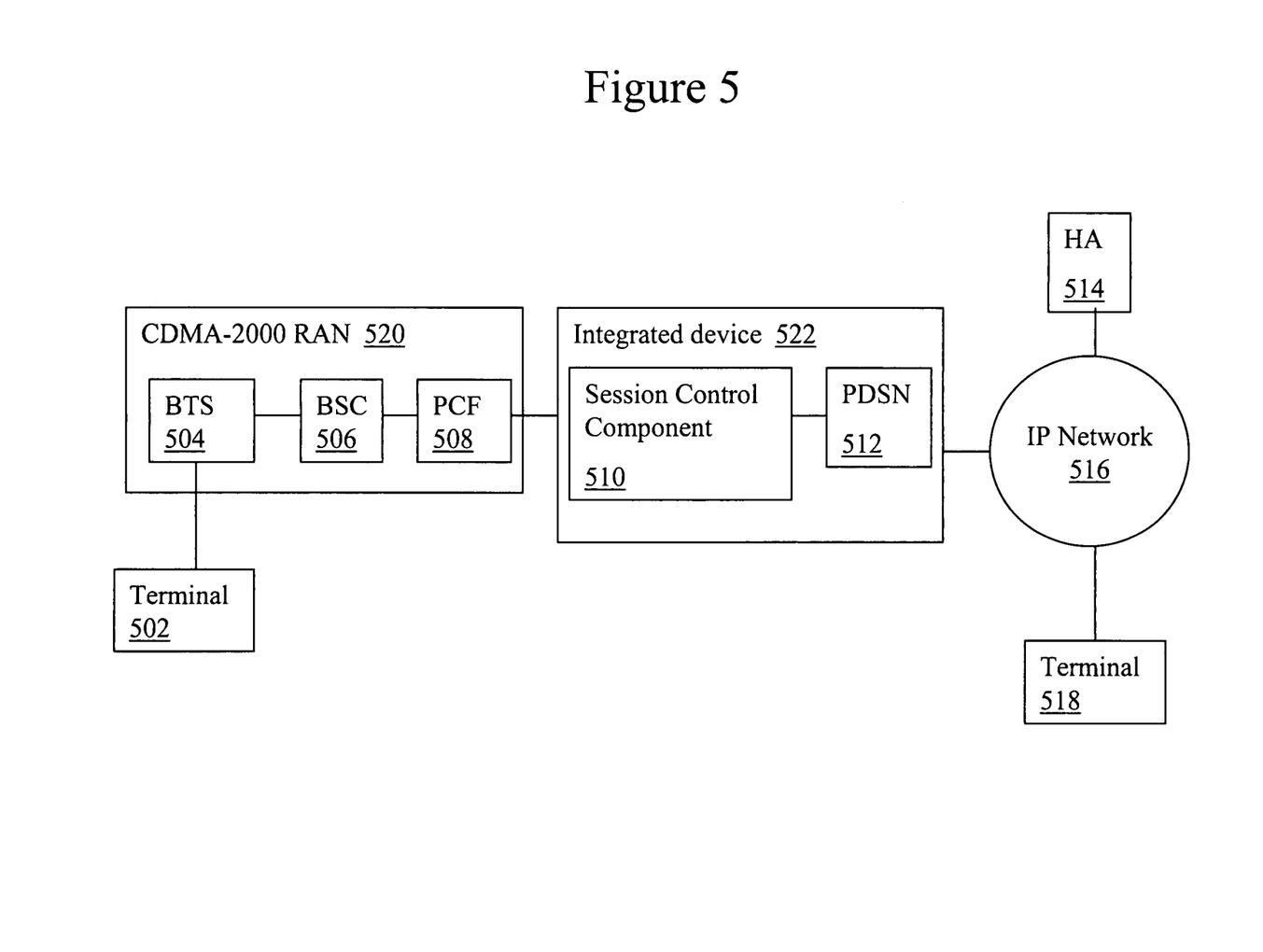
FIG. 5 is a block diagram depicting an integrated device according to various embodiments of the present invention in communication with a CDMA-2000 RAN.

Alternatively, a session control component can also be integrated with a policy enforcement component of an AGW system. FIG. 5 is a block diagram depicting an integrated device 522 according to various embodiments of the present invention in communication with a CDMA-2000 RAN 520. RAN 520, which communicates with a terminal 502 wirelessly, can include a BTS 504, a BSC 506, and a PCF 508. Integrated device 522 can include a session control component (e.g., CSCF component) 510 and a PDSN 512. Device 522 can be connected to an HA 514 and a terminal 518 through a PDN such as an IP network 516. PDSN 512 can serve as a policy enforcement component as part of an AGW system (not shown) that interfaces between CDMA-2000 RAN 520 and IP network 516. During a communication session setup, update, and/or teardown, session control component 510 can receive and process signaling messages such as SIP messages, obtain end-to-end session information and policy decisions, and reconfigure PDSN 512 with the session information and policy decisions. Because session control component 510 and PDSN 512 are integrated into a single device, the reconfiguration of PDSN 512 can be achieved internally without MIP messages being exchanged.

Various embodiments of the present invention can also be used in communication networks based on technologies other than CDMA-2000. For example, embodiments of the present invention can be used in connection with a RAN based on WiMAX, UMTS, GSM, or other types of technologies. As an example, an AGW system of various embodiments can include an Access Service Network (ASN) Gateway configured to interface with a Worldwide Interoperability for Microwave Access (WiMAX) radio access network and a packet data network.

Figure 6:
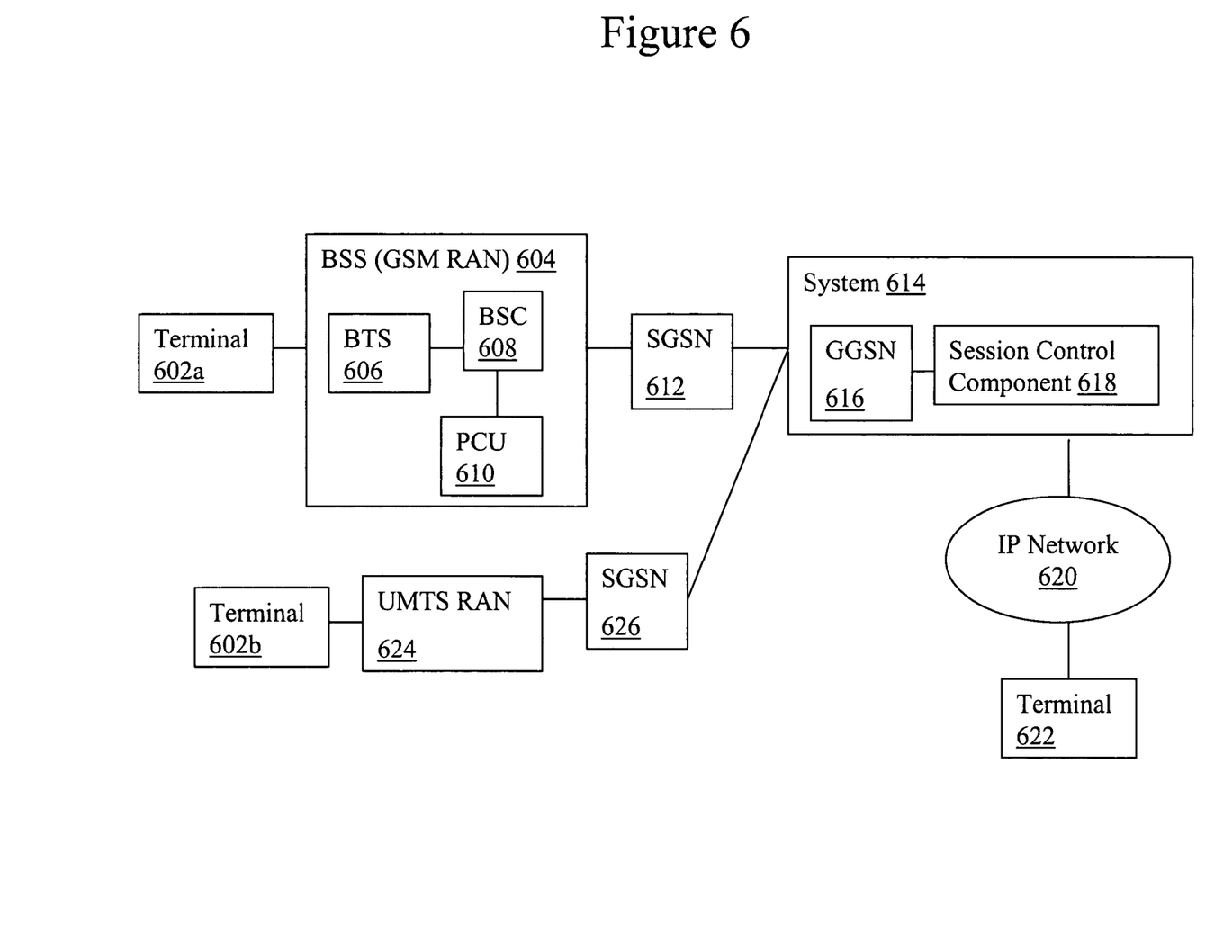
FIG. 6 is a block diagram depicting a system according to various embodiments of the present invention in communication with a GSM RAN and a UMTS RAN.

FIG. 6 is a block diagram depicting a system 614 according to various embodiments of the present invention in communication with a GSM RAN 604 and a UMTS RAN 624. GSM RAN 604, often referred to as a Base Station Subsystem (BSS), can include a BTS 606, a BSC 608, and a Packet Control Unit (PCU) 610. The GSM and UMTS RANs 604 and 624 can communicate with wireless terminals (e.g., terminals 602a and 602b) and can be respectively connected to device 614 through Serving GPRS Support Nodes (SGSNs) 612 and 626. System 614 can include a Gateway GPRS Support Node (GGSN) 616 and a session control component 618. GGSN 616 can serve as a policy enforcement component (e.g., a PEP) as part of an AGW system (not shown) that interfaces between GSM RAN 604 and a PDN such as an IP network 620. System 614 can be connected to a terminal 622 through IP network 620.

During communication session setup, update, and/or teardown, session control component 618 can receive and process signaling messages such as SIP messages, obtain end-to-end session information and policy decisions, and directly reconfigure GGSN 616 with the session information and policy decisions. In one embodiment, session control component 618 and GGSN 616 can be distinct devices, and session control component 618 can reconfigure GGSN 616 by sending the session information and policy decisions using MIP messages containing MIP extensions. In another embodiment, session control component 618 and GGSN 616 can be integrated into a single device, and therefore the reconfiguration of GGSN 616 can be performed internally without MIP messages being exchanged.

Figure 7:
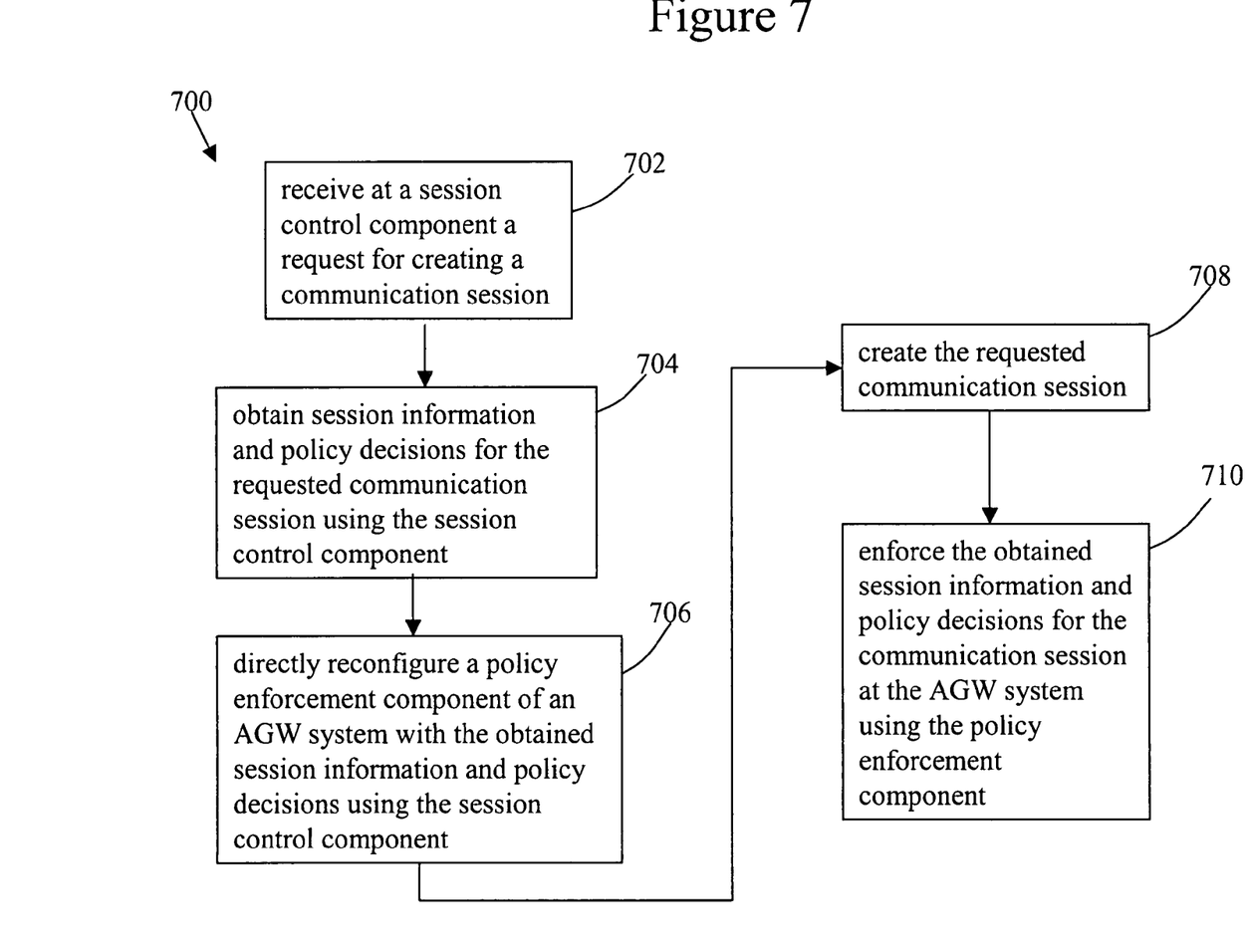
FIG. 7 is a flow chart illustrating a method according to various embodiments of the present invention.

FIG. 7 is a flow chart illustrating a method of various embodiments of the present invention, generally at 700. Method 700 can be used to create communication sessions in a wireless communication network including a session control component (e.g., a CSCF component) and an AGW system having a policy enforcement component. The AGW system can interface one or more RANs and one or more PDNs. At step 702, a session control component in the communication network can receive a request for creating a communication session. At step 704, the session control component can obtain session information and policy decisions for the requested communication session. At step 706, the session control component can directly reconfigure the policy enforcement component of the AGW system with the obtained session information and policy decisions. At step 708, the requested communication session is created. At step 710, the policy enforcement component of the AGW system can enforce the obtained policy decisions for the communication session.

Other embodiments, extensions, and modifications of the ideas presented above are comprehended and within the reach of one practiced in the field upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

The invention claimed is:

1. A system comprising:
an Access Gateway (AGW) system configured to interface with at least one radio access network and at least one packet data network, the AGW system including
a policy enforcement component, and
a session control component configured to
receive one or more communication session control requests,
obtain session information and policy decisions from a policy decision component corresponding to the one or more communication session control requests, and
directly reconfigure the policy enforcement component to enforce the obtained session information and policy decisions,
wherein the AGW system comprises a Packet Data Service Node (PDSN),
wherein the session control component is integrated with a Home Agent (HA) and the PDSN to form a single device,
wherein the policy enforcement component and the session control component are integrated into a single device, the single device in communication with the radio access network and the packet data network, and
wherein reconfiguration of the policy enforcement component is achieved internally within the AGW without Mobile Internet Protocol (MIP) messages being exchanged, thereby reducing the signaling associated with at least one of the setup, update and teardown of a communication session.

2. The system of claim 1, wherein the session control component comprises a Call Session Control Function (CSCF) component.

3. The system of claim 1, wherein the AGW system comprises an Access Service Network (ASN) Gateway configured to interface with at least one Worldwide Interoperability for Microwave Access (WiMAX) radio access network and at least one packet data network.

4. The system of claim 1, wherein the one or more communication session control requests comprise Session Initiation Protocol (SIP) messages.

5. A method comprising:
configuring an Access Gateway (AGW) system to interface with at least one radio access network and at least one packet data network;
receiving at a session control component a communication session control request;
obtaining session information and policy decisions from a policy decision component corresponding to the communication session control request using the session control component;
directly reconfiguring a policy enforcement component of the AGW system with the obtained session information and policy decisions using the session control component; and
enforcing the obtained session information and policy decisions corresponding to the communication session control request at the AGW system using the policy enforcement component, wherein the session control component comprises a Call Session Control Function (CSCF) component, wherein the session control component is integrated with a Home Agent (HA) to form a single device, wherein the AGW system comprises a Packet Data Service Node (PDSN), wherein the policy enforcement component and the session control component are integrated into a single device, wherein the single device is in communication with the radio access network and the packet data network, and wherein reconfiguration of the policy enforcement component is achieved internally within the AGW without Mobile Internet Protocol (MIP) messages being exchanged, thereby reducing the signaling associated with at least one of the setup, update and teardown of a communication session.

6. The method of claim 5, wherein the communication session control request comprises a Session Initiation Protocol (SIP) message.

7. A system comprising:

an Access Gateway (AGW) system configured to interface with at least one radio access network and at least one packet data network, the AGW system having means for enforcing policy decisions for one or more communication sessions; and session control means for handling one or more communication session control requests, wherein the session control means receives the one or more communication session control requests, obtains session information and policy decisions from a policy decision component corresponding to the one or more communication session control requests, and directly reconfigures the enforcing means to enforce the obtained session information and policy decisions, wherein the session control means is integrated with the GGSN to form a single device, wherein the AGW system comprises a Gateway General Packet Radio Service (GPRS) Support Node (GGSN), wherein the AGW, the session control means and the means for enforcing policy decisions are integrated into a single device, and wherein the single device is in communication with the radio access network and the packet data network.

8. The system of claim 7, wherein the session control means reconfigures the enforcing means without MIP messages being exchanged.

9. The system of claim 7, wherein the session control means reconfigures the enforcing means without MIP messages being exchanged.

10. The system of claim 7, wherein the AGW system comprises an Access Service Network (ASN) Gateway configured to interface with at least one Worldwide Interoperability for Microwave Access (WiMAX) radio access network and at least one packet data network.

11. The system of claim 7, wherein the one or more communication session control requests comprise a Session Initiation Protocol (SIP) message.

12. A method comprising:

configuring an Access Gateway (AGW) system to interface with at least one radio access network and at least one packet data network;

receiving at a session control component a communication session control request;

obtaining session information and policy decisions from a policy decision component corresponding to the communication session control request using the session control component;

directly reconfiguring a policy enforcement component of the AGW system with the obtained session information and policy decisions using the session control component; and enforcing the obtained session information and policy decisions corresponding to the communication session control request at the AGW system using the policy enforcement component, wherein the AGW system comprises a Gateway General Packet Radio Service (GPRS) Support Node (GGSN), wherein the AGW, the policy enforcement component and the session control component are integrated into a single device, wherein the single device is in communication with the radio access network and the packet data network, and wherein reconfiguration of the policy enforcement component is achieved internally within the AGW without Mobile Internet Protocol (MIP) messages being exchanged, thereby reducing the signaling associated with at least one of the setup, update and teardown of a communication session.

\* \* \* \* \*